United States Patent [19]

Vanneman

[11] Patent Number: 5,764,349
[45] Date of Patent: Jun. 9, 1998

[54] SELF-ALIGNING BASELINE PLANE INSTRUMENT

[75] Inventor: Robert W. Vanneman, Caspar, Calif.

[73] Assignee: Laserline Manufacturing, Inc., Ft. Bragg, Calif.

[21] Appl. No.: 766,398

[22] Filed: Dec. 12, 1996

[51] Int. Cl.$^6$ .................................................. C01B 11/26
[52] U.S. Cl. ........................... 356/138; 356/400; 33/286
[58] Field of Search ........................... 356/138, 148–149, 356/400, 399, 153, 249, 248; 33/290–299, 381, 286

[56] References Cited

U.S. PATENT DOCUMENTS

| | | |
|---|---|---|
| 3,588,249 | 6/1971 | Studebaker . |
| 3,600,095 | 8/1971 | Tanaka ................................. 356/138 |
| 3,748,041 | 7/1973 | Bird . |
| 3,771,876 | 11/1973 | Ljungdahl et al. . |
| 4,062,634 | 12/1977 | Rando et al. . |
| 4,293,218 | 10/1981 | Nielsen et al. . |
| 4,297,031 | 10/1981 | Hamar . |
| 4,382,680 | 5/1983 | Hamar . |
| 4,468,119 | 8/1984 | Hamar . |
| 4,679,937 | 7/1987 | Cain et al. . |
| 4,685,806 | 8/1987 | Arnberg . |
| 4,725,737 | 2/1988 | Nakata et al. . |
| 4,748,571 | 5/1988 | Shippy . |
| 4,770,480 | 9/1988 | Teach . |
| 4,772,123 | 9/1988 | Radner . |
| 4,815,845 | 3/1989 | Colbaugh et al. . |
| 4,830,489 | 5/1989 | Cain et al. . |
| 4,836,669 | 6/1989 | Teach . |
| 4,861,162 | 8/1989 | Ina . |
| 4,869,591 | 9/1989 | MacGregor . |
| 4,907,881 | 3/1990 | Jones . |
| 4,971,440 | 11/1990 | Winckler et al. . |
| 5,033,847 | 7/1991 | Hamblin et al. . |
| 5,047,609 | 9/1991 | Ekstrand . |
| 5,144,486 | 9/1992 | Hart . |
| 5,257,279 | 10/1993 | Dugan et al. . |

*Primary Examiner*—K. Hantis
*Attorney, Agent, or Firm*—Townsend and Townsend and Crew LLP

[57] ABSTRACT

An apparatus for producing a pair of beams of light at a desired angle to each other. A light emitter and any associated optics generate a first beam of light which is directed to a remote target. The target reflects the light back, which is detected by a light detector. Separately, a second light emitter and any associated optics generates a second beam of light at an angle to the first plane of light. The second light emitter and optics is on a support structure which is moveable with respect to the first structure, and in one embodiment shares the same axis as the first support structure for holding the first light emitter and its optics. An angle measuring device indicates the angle of the second light beam with respect to the first light beam. The angle is maintained by adjusting the first support structure to maintain the reflection of the first beam to the detector.

17 Claims, 2 Drawing Sheets

SELF-ALIGNING BASELINE PLANE INSTRUMENT

BACKGROUND OF THE INVENTION

The present invention relates to laser alignment devices for producing beams of light at angles to each other.

In many applications, such as construction, surveying, and industrial alignment applications, there is a need to establish a beam or plane of light in order to align different elements of a structure. In particular, a plane of light which provides precise vertical alignment at a distance at different height levels is useful in erecting walls, aligning corners, etc. in a building.

One method of producing a level horizontal laser beam, and also a plane of light, is set forth in U.S. Pat. No. 5,108,177, originally assigned to the same Assignee and hereby incorporated herein by reference. U.S. Pat. No. 5,108,177 shows the use of a pendulum with a mirror on it for producing a precisely horizontal beam of light. The beam can then be turned into a sweeping plane of light by projecting the horizontal beam onto a rotating pentaprism. FIG. 1 herein sets forth the structure in that patent. The '177 patent also discusses generating a second beam at 90° to a first beam.

The details of the construction of a pentaprism, which is a rotating optical device for producing a plane of light from a laser beam, is set forth in U.S. Pat. No. 4,062,634, hereby incorporated herein by reference. Another method for producing a plane of light from a laser beam using an optical cone is set forth in U.S. Pat. No. 5,257,279, incorporated herein by reference.

SUMMARY OF THE INVENTION

The present invention provides an apparatus for producing a pair of beams of light at a desired angle to each other. A light emitter and any associated optics generate a first beam of light which is directed to a remote target. The target reflects the light back, which is detected by a light detector. Separately, a second light emitter and any associated optics generates a second beam of light at an angle to the first plane of light. The second light emitter and optics is on a support structure which is moveable with respect to the first structure, and in one embodiment shares the same axis as the first support structure for holding the first light emitter and its optics. An angle measuring device indicates the angle of the second light beam with respect to the first light beam. The angle is maintained by adjusting the first support structure to maintain the reflection of the first beam to the detector.

The light beams are preferably produced by two lasers, or a single laser with a beam splitter or other optics. The beams of light are preferrably planes of light, or scanning beams of light. A motor preferrably automatically corrects the alignment of the laser beam using the detected signal to insure that the plane of light is directed at the target. In one embodiment, the remote target is a pentaprism which produces a plane of light as a reflection of the received plane of light.

For a further understanding of the nature and advantages of the invention, reference should be made to the following description taken in conjunction with the accompanying drawings.

DETAILED DESCRIPTION OF THE PREFERRED EMBODIMENT

Figure 1:
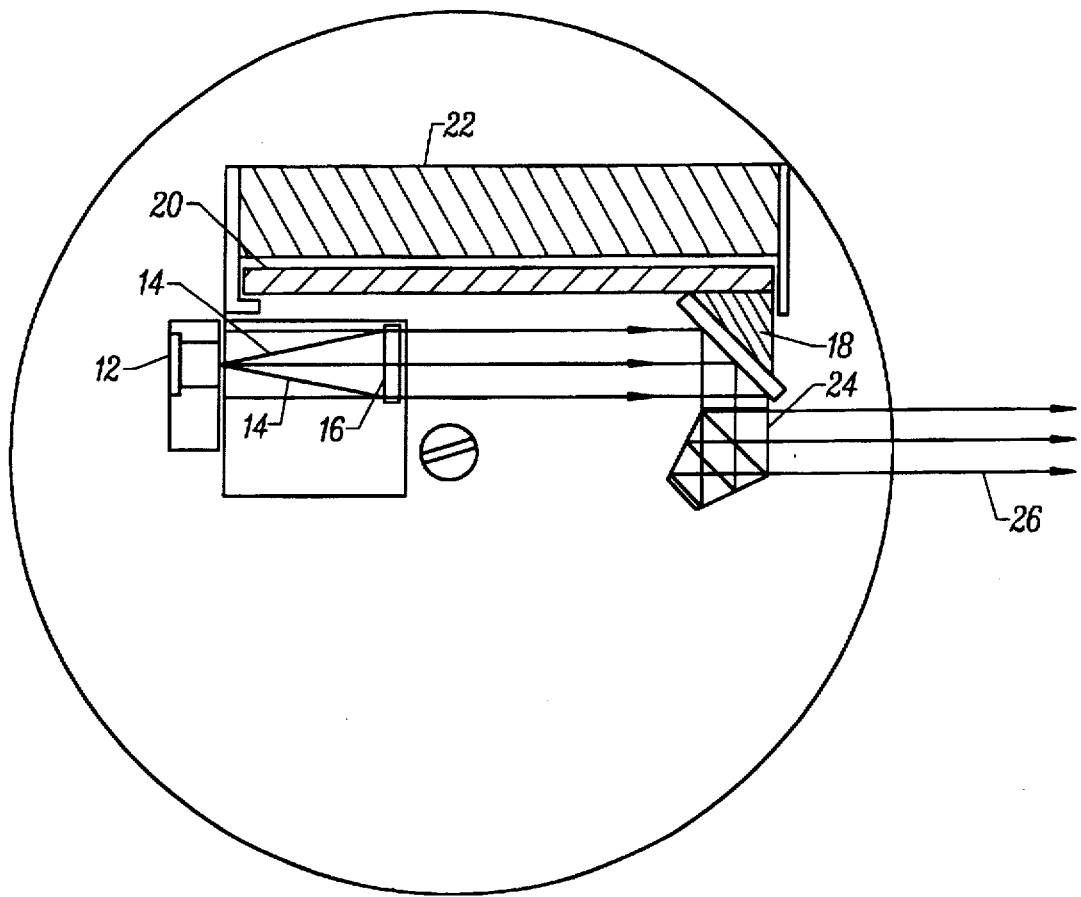
FIG. 1 is a diagram of a prior art device showing a mirror mounted on a pendulum.

FIG. 1 is a diagram of the prior art pendulum mounted mirror of U.S. Pat. No. 5,108,177, assigned to the same Assignee as the Assignee of the present invention. The pendulum and support structure are shown from the top in FIG. 1 in order to clearly illustrate the laser beam path. FIG. 1 shows a laser 12 which emits a diverging laser beam 14 which is collimated by a collimating lens 16. The laser beam is reflected off of a mirror 18 which is mounted on a pendulum 20. The pendulum is suspended from a support structure 22.

The laser beam is then reflected off mirror 18 to product a precisely horizontal laser beam. The laser beam is directed to a pentaprism 24 which rotates to produce a rotating beam of light, or a plane of light 26 which is vertical. The pentaprism is mounted on the same support structure as the pendulum.

Figure 2B:
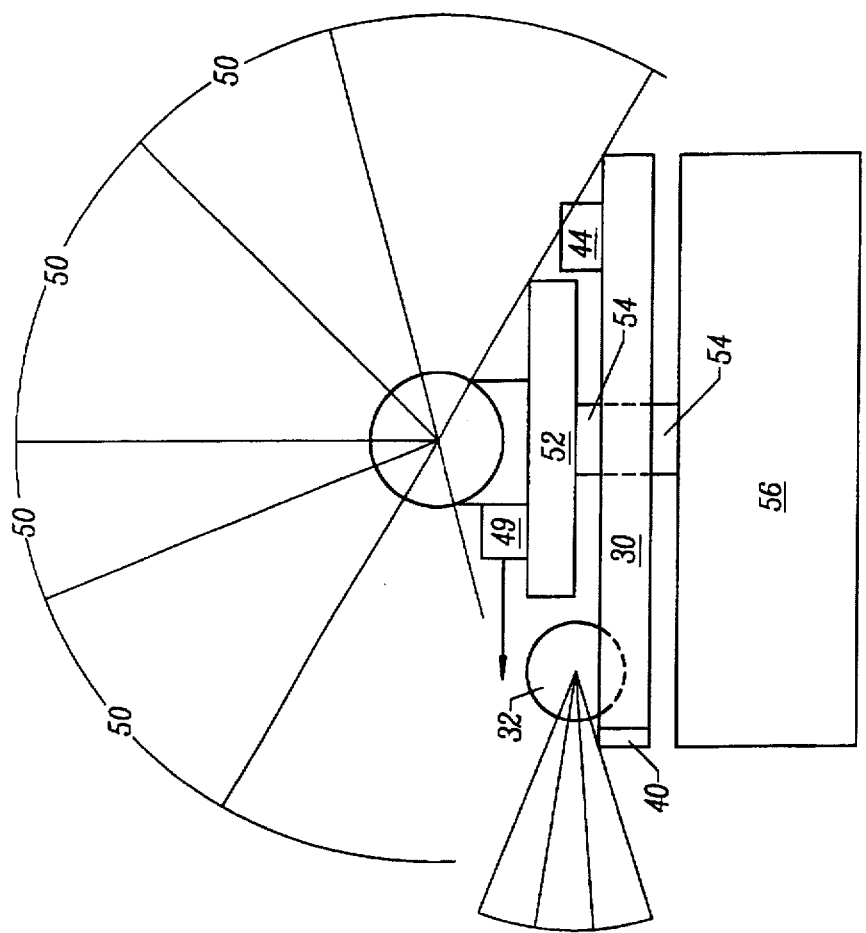
FIGS. 2A and 2B are top and side views of one embodiment of a self-aligning apparatus according to the present invention.
Figure 2A:
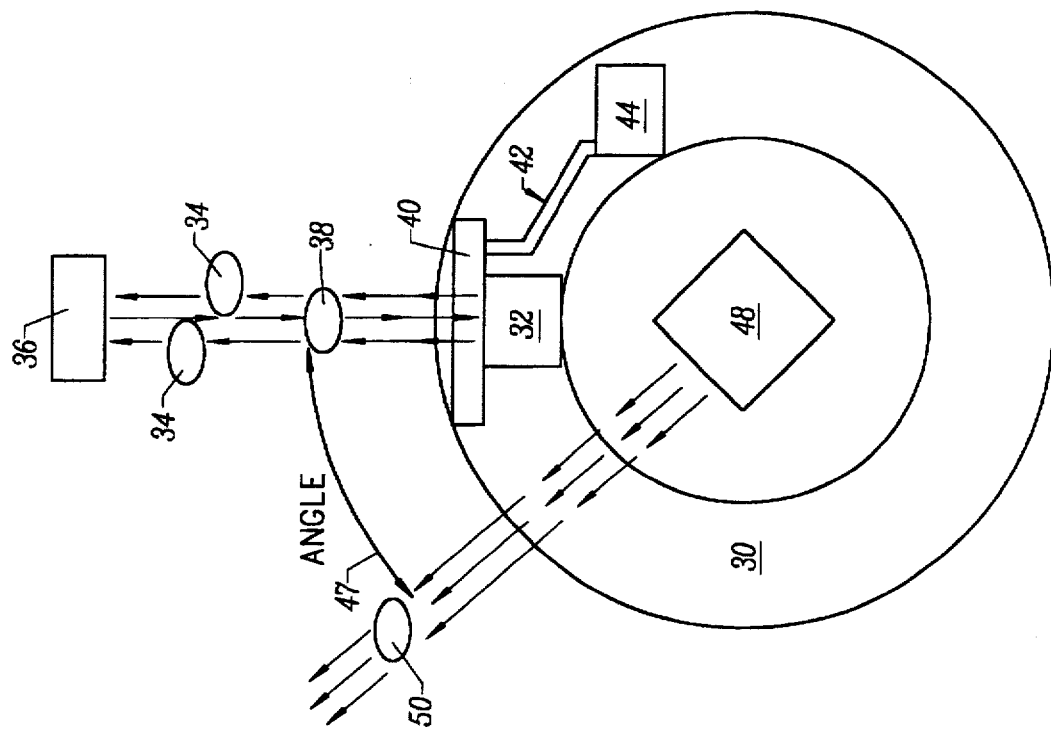

FIG. 2A is a top view of one embodiment of a self-aligning instrument according to the present invention. A first support structure 30 holds a laser and associated optics assembly 32. Assembly 32 may be an assembly such as shown in FIG. 1. Laser assembly 32 produces a first plane of light 34 to a target reflector 36. Reflector 36 may reflect a beam of light, or, preferably, reflects a plane of light 38. In one embodiment, reflector 36 is a pentaprism or retroreflector or any optical device or reflective material which returns the laser beam. Plane of light 38 is detected by photocell 40 also mounted on support structure 30. Planes or beams of light 34 and 38 comprise a self-aligning baseline beam or plane of light.

A signal generated by the photocell is transmitted on a signal line 42 to a motor 44 coupled to support structure 30. Motor 44 will move the support structure to maintain the detection of the signal by photocell 40. If the laser plane drifts out of alignment, the motor will move the assembly until the reflector beam is again detected.

In an alternate embodiment, instead of the motor, a manually operated knob can be used to realign the laser plane with an indicator producing a visual indication when the photocell detects the reflected signal.

A second support structure 46 (see side view in FIG. 2B) supports a second laser/optical assembly 48 for producing a second beam of light 50. An angle encoder 52 is coupled to the second support structure 46 for indicating an angle 47 of plane 50 with respect to plane 34. Support structure 46 can be mounted over motor 44 so that it shares a common axis 54, or they can be side by side. The two support structures are mounted on a third, overall leveling platform 56 for the apparatus.

In an alternate embodiment, a single laser could be used with a beam splitter. A fiber optic cable could then be used to connect to the second support structure. Alternately, a beam splitter could be the second support structure, and could be turned to provide the second beam, with additional optics possibly used to maintain the first beam.

A plane of light could be produced with a pentaprism, or by directing a laser at a stationary cone-shaped optic which spreads the beam 360 degrees. Alternately, a scanning beam could be used.

In operation, in a search mode laser 32 rotates back and forth until it hits reflector 36 and detector 40 detects the reflected beam. The position is then locked on to maintain the baseline. The angle measuring device or angle encoder is then set to zero, or other desired base angle. The second support structure is then turned to the desired angle. When that angle is reached, the baseline is maintained by manually or automatically with motor 44 adjusting the position of laser 32 to maintain the baseline. This will adjust for any slippage, such as due to the apparatus being bumped or tilting due to a support leg slipping or sinking, etc.

In yet another alternate embodiment, a third laser could be mounted anywhere above platform 56 to produce a level horizontal beam or plane. This could be used to provide leveling information at a receiver. Since platform 56 is leveled, the beam or plane of light will also be level. Such a laser is shown as laser 49 in FIG. 2B.

As will be understood by those familiar with the art, the present invention may be embodied in other specific forms without departing from the spirit or central characteristics thereof. Accordingly, the foregoing description is intended to be illustrative, but not limiting, of the scope of the invention which is set forth in the following claims.

What is claimed is:

1. An apparatus for producing a pair of beams of light at an angle to each other, comprising:

a first support structure;

a first light emitter mounted on said first support structure to produce a first beam of light;

a light detector mounted on said first support structure at a position for detecting the reflection of said first beam of light off a target, and producing a signal indicating that said target is aligned with said first beam of light;

a second support structure, coupled to said first support structure and movable with respect to said first support structure;

a second light emitter mounted on said second support structure to produce a second beam of light; and an angle measuring device coupled to said second support structure to indicate an angle corresponding to an angle between said first and second beams of light.

2. The apparatus of claim 1 wherein said angle is any selectable angle between at least 0 and 90 degrees.

3. The apparatus of claim 1 wherein said angle is any selectable angle over 360 degrees.

4. The apparatus of claim 1 further comprising:

an optical assembly mounted on said first support structure for converting said first beam of light into a first plane of light.

5. The apparatus of claim 1 further comprising:

a second optical assembly mounted on said second support structure and configured to convert said second beam of light into a second plane of light.

6. The apparatus of claim 1 further comprising:

a motor coupled to one of said support structures, said motor being configured to move responsive to a signal from said light detector.

7. The apparatus of claim 1 wherein one of said first and second emitters is a direct output of a laser, and the other of said first and second emitters is an optic device optically coupled to said laser, such that said laser produces light emitted at both said first and second light emitters.

8. The apparatus of claim 1 wherein said first and second light emitters are lasers.

9. The apparatus of claim 1 wherein said first and second support structures share a common axis.

10. The apparatus of claim 1 further comprising a third support structure configured to support said first and second support structures.

11. The apparatus of claim 1 further comprising a reflector positioned at a desired target of said first beam of light to reflect said beam of light.

12. The apparatus of claim 11 wherein said reflector reflects a plane of light.

13. The apparatus of claim 12 wherein said reflector is a pentaprism.

14. An apparatus for producing a pair of beams of light at an angle to each other, comprising:

a first support structure;

a first laser mounted on said first support structure to produce a first beam of light;

a light detector mounted on said first support structure at a position for detecting the reflection of said first beam of light off a target, and producing a signal indicating that said target is aligned with said first beam of light;

a motor coupled to said first support structure, said motor being configured to move responsive to a signal from said light detector;

a second support structure, coupled to said first support structure and movable with respect to said first support structure;

a second laser mounted on said second support structure to produce a second beam of light;

an angle measuring device coupled to said second support structure to indicate an angle corresponding to an angle between said first and second beams of light;

a third support structure configured to support said first and second support structures; and a reflector positioned at a desired target of said first plane of light, said reflector being configured to reflect a beam of light.

15. The apparatus of claim 14 wherein at least one of said beams is part of a plane of light.

16. The apparatus of claim 14 wherein at least one of said beams is a scanning beam of light producing a plane of light.

17. An apparatus for producing a pair of planes of light at an angle to each other, comprising:

a first support structure;

a first laser mounted on said first support structure to produce a first beam of light;

an optical assembly for converting said beam of light into a first plane of light;

a light detector mounted on said first support structure;

a motor coupled to said first support structure, said motor being configured to move responsive to a signal from said light detector;

a second support structure, coupled to said first support structure and movable with respect to said first support structure, and sharing a common axis with said first support structure;

a second laser mounted on said second support structure to produce a second beam of light;

a second optical assembly mounted on said second support structure and configured to convert said second beam of light into a second plane of light;

an angle encoder coupled to said second support structure to indicate an angle corresponding to an angle between said first and second beams of light; a third support structure configured to support said first and second support structures; and a reflector positioned at a desired target of said first plane of light, said reflector being configured to reflect a plane of light;

said light detector producing a signal indicating when said reflector is aligned with said first plane of light.

* * * * *